(12) United States Patent
Smith

(10) Patent No.: US 7,624,127 B2
(45) Date of Patent: Nov. 24, 2009

(54) APPARATUS, SYSTEM, AND METHOD FOR AUTOMATING VTOC DRIVEN DATA SET MAINTENANCE

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 11/557,718

(22) Filed: Nov. 8, 2006

(65) Prior Publication Data

US 2008/0109599 A1    May 8, 2008

(51) Int. Cl.
*G06F 12/00* (2006.01)
*G06F 17/30* (2006.01)
(52) U.S. Cl. .................. 707/200; 707/201; 707/204
(58) Field of Classification Search .......... 707/200–206
See application file for complete search history.

(56) References Cited

U.S. PATENT DOCUMENTS

| | | | | |
|---|---|---|---|---|
| 4,408,273 | A * | 10/1983 | Plow | 707/202 |
| 6,185,638 | B1 | 2/2001 | Beardsley et al. | 710/36 |
| 6,202,124 | B1 | 3/2001 | Kern et al. | 711/112 |
| 6,631,477 | B1 | 10/2003 | LeCrone et al. | 714/5 |
| 6,675,175 | B2 * | 1/2004 | Branch et al. | 707/200 |
| 6,754,682 | B1 * | 6/2004 | LeCrone et al. | 707/204 |
| 6,910,214 | B1 | 6/2005 | Reed et al. | 719/310 |
| 6,912,632 | B2 | 6/2005 | Mori | 711/162 |
| 7,013,305 | B2 * | 3/2006 | Elko et al. | 707/100 |
| 2005/0076159 | A1 | 4/2005 | Machida et al. | 710/1 |
| 2005/0108485 | A1 | 5/2005 | Perego | 711/162 |
| 2005/0187990 | A1 | 8/2005 | Pace et al. | 707/204 |
| 2005/0289318 | A1 | 12/2005 | Mori et al. | 711/170 |

OTHER PUBLICATIONS

ICF Catalog Backup and Recovery, a practical guide Redbook; IBM , 1999-2001.*
"Utilities for z/OS (OS/390) Disk data Sets," UF Computing & Networking Services.

* cited by examiner

*Primary Examiner*—Kuen S Lu
*Assistant Examiner*—Loan T Nguyen
(74) *Attorney, Agent, or Firm*—Kunzler & McKenzie

(57) ABSTRACT

The present invention increases the efficiency of dynamically, reusable computer environments by first retrieving data set information from a volume table of contents (VTOC) to ensure its consistency with the catalog. After obtaining the necessary information about the data sets, control statements are generated and appropriate programs invoked to perform the desired maintenance operations. Reinitializing and reconfiguring the reusable computer environment by starting with the VTOC prevents post-maintenance issues such as a data set with an entry in an integrated catalog facility (ICF) catalog while the data set no longer exists on a volume, a cataloged virtual storage access method (VSAM) cluster with disassociated DATA or INDEX data sets, and a data set catalog entry that has been scratched while the data set still exists on a volume. The present invention saves time and money by preventing such problems up-front instead of correcting them after-the-fact.

18 Claims, 6 Drawing Sheets

APPARATUS, SYSTEM, AND METHOD FOR AUTOMATING VTOC DRIVEN DATA SET MAINTENANCE

BACKGROUND OF THE INVENTION

1. Field of the Invention

This invention relates to data set maintenance on a mainframe computer system comprising a catalog directory structure and more particularly relates to automating volume table of contents (VTOC) driven data set maintenance.

2. Description of the Related Art

In dynamically reusable software environments, such as test environments, automated test cases reconfigure and reinitialize the contents of a direct access storage device (DASD). Data sets which have been allocated for prior test cases are removed en masse to make space for data sets required by new tests. A given test case or process does not necessarily know which test case preceded it, and does not necessarily know what the prior contents of the DASD were. Consequently, various programs are used to scratch the entire contents of a volume using a VTOC parameter, which specifies that all data sets on an indicated volume, with a few specific exceptions, are to be scratched. While this process eliminates the necessity to know the specific contents of a volume before removing them, it does not remove the entries for the scratched data sets in the various integrated catalog facility (ICF) catalogs that reference the scratched data sets.

Consequently, catalogs may reference data sets which no longer exist. If subsequent steps in the process try to access a data set which no longer exists, or try to validate the existence of the data set, the catalog entry which no longer reflects the actual status of the data set will cause unexpected results or errors. Consequently, automated tests may fail resulting in allocation failures, duplicate data set name errors, and a loss of productivity.

Presently, a maintenance operation to remove data sets allocated to a prior test case is categorized as SCRATCH VTOC type DASD maintenance because it uses the VTOC parameter of a maintenance utility to scratch the contents of the DASD. As a result of this type of maintenance, several ill favored situations can arise. For example, a data set may have an entry in an ICF catalog but no longer exist on a volume. Another example might be that a virtual storage access method (VSAM) cluster may be cataloged but the DATA or INDEX data set associated with the VSAM cluster may no longer exist on a volume. Yet another example that might occur due to maintenance, but not SCRATCH VTOC type DASD maintenance, might be that the data set exists on a volume but no longer has an entry in an ICF catalog. There are no current solutions that will prevent these problems and others from arising due to maintaining dynamically-reusable environments. Current solutions are only aimed at remedying the problems that arise due to maintenance, therefore, they can be characterized as after-the-fact remedies.

For example, one such remedy utilizes a program with a parameter to handle cataloging issues in order to fix data set problems. Similarly, another program used as an after-the-fact remedy includes a parameter for fixing VSAM cluster problems. Although these programs are capable of remedying most ICF catalog issues that arise after maintenance, they require substantial input from a user, who must spend time analyzing an error situation, to be capable of remedying that error situation. These programs can be used by themselves or in combination to remedy data set problems and VSAM cluster problems resulting from data set maintenance. Unfortunately, they consume valuable time and resources after the maintenance which leads to the problem.

Other programs are available to fix catalog problems after-the-fact. One such program is IBM's Integrated Catalog Forward Recovery Utility (ICFRU). ICFRU is a basic tool to help in a forward recovery situation. ICFRU does not offer a wide range of features, but can help for catalog recovery. Because it is a limited program, it is only beneficial under certain circumstances. One circumstance might be where the problem arises due to a data set reportedly being cataloged but not actually existing. Consequently, it would not be able to remedy all problems occurring due to data set maintenance, such as when the data set exists and is supposed to be cataloged, but is not.

Still other programs are capable of recovering a catalog after a disaster. Although these programs have increased the speed at which problems occurring due to maintenance are fixed, they are not capable of preventing those problems from occurring. Thus, they are a round-a-bout after-the-fact way of dealing with errors due to data set maintenance. A more efficient approach would be to prevent the errors from occurring, which would eliminate the need for after-the-fact remedies.

Due to the foregoing, a need exists for an apparatus, system, and method that would prevent problems from occurring due to a SCRATCH VTOC-type DASD maintenance such as a data set having an entry in an ICF catalog but no longer existing on a volume, a VSAM cluster being cataloged but the DATA or INDEX data set associated with the VSAM cluster no longer existing on a volume, or a data set existing on a volume but no longer having an entry in an ICF catalog. Beneficially, such an apparatus, system, and method would automate VTOC driven data set maintenance.

SUMMARY OF THE INVENTION

The present invention has been developed in response to the present state of the art, and in particular, in response to the problems and needs in the art that have not yet been fully solved by currently available data set maintenance resources on dynamically, reusable environments. Accordingly, the present invention has been developed to provide an apparatus, system, and method for automating VTOC driven data set maintenance that overcome many or all of the above-discussed shortcomings in the art.

The apparatus to automate VTOC driven data set maintenance is provided with a logic unit containing a plurality of modules configured to functionally execute the necessary steps of automating VTOC driven data set maintenance to reconfigure and reinitialize dynamically, reusable environments. These modules in the described embodiments include an information module, a determination module, an identification module, a control statement generation module, and an execution module.

The apparatus, in one embodiment, is configured to retrieve information about data sets residing on a volume from a volume table of contents (VTOC). The volume may be identified by an initial set of control statements. The volume may also be predetermined. The initial set of control statements facilitates determining the maintenance operations to perform on the data sets. The maintenance may include cataloging, uncataloging, or deleting data sets. By applying the information retrieved from the VTOC to the maintenance operations determined, the method may generate control statements to accomplish the desired tasks.

Generating control statements may include generating a variety of syntactically different control statements depending on the type of data set being maintained or the utility that will execute the control statement. Executing the control statements may include selecting the proper utility to run each control statement. The apparatus may gather information from the VTOC to ensure its consistency with the appropriate catalog. This may also prevent reconfiguration and initialization errors. Such errors include leaving an ICF catalog entry for a data set that no longer exists on a volume and leaving VSAM clusters cataloged without a DATA or INDEX data set on a volume.

The apparatus is further configured, in one embodiment, to selectively bypass data sets during the maintenance operations. The data sets to bypass may be indicated by parameters of the set of initial control statements. This enables certain data sets to remain constant, such as data sets required for booting the computer environment.

In a further embodiment, the apparatus may be configured to designate a supplemental identifier in situations where a control statement being generated requires a VSAM cluster name, but one is not available. The set of initial control statements are examined for the presence of a VSAMLLQ function. If the VSAMLLQ function is not provided or a value is not assigned to it, then a supplemental identifier is substituted and used as the association identifier.

A system of the present invention is also presented to automate VTOC driven data set maintenance. The system may be embodied in a mainframe computer environment or other computer environment. In particular, the system, in one embodiment, includes a computer, at least one integrated catalog facility (ICF) catalog, and a data set maintenance resource. The data set maintenance resource may include an information module, a determination module, an identification module, a control statement module, and an execution module in accordance with the present invention.

The system may be further configured to respond to an initial set of control statements. The data set maintenance resource may utilize the initial set of control statements to determine the maintenance operations to perform on the dynamically reusable environment of the mainframe computer. The data set maintenance resource may examine the VTOC to ensure its consistency with the appropriate catalogs.

A method of the present invention is also presented for automating VTOC driven data set maintenance. The method in the disclosed embodiments substantially includes the steps necessary to carry out the operations presented above with respect to the operation of the described apparatus and system. In one embodiment, the method includes retrieving information from a VTOC. The VTOC contains information regarding data sets that can be used to eliminate any potential mismatches of the volume contents and the associated catalogs. The method also may include determining the maintenance operations to perform. In one embodiment, the maintenance operations are determined based on a set of initial control statements provided by a director.

The method also may include identifying related data sets by using an association identifier. The association identifier may be the name of a VSAM cluster. The set of initial control statements may acquire the VSAM cluster name via a VSAM-LLQ operation, which may be a parameter of the set of initial control statements. The VSAMLLQ function may extrapolate the VSAM cluster name by replacing a low-level qualifier name of the data set with a value assigned to the VSAMLLQ function. In one embodiment, the VSAMLLQ function or value might not be provided in the set of initial control statements, in this embodiment, a supplemental identifier may be substituted as the association identifier to satisfy control statement requirements.

The method may generate control statements to perform the maintenance operations. The maintenance operations may be different for different types of data sets. As a result, the maintenance operations may be syntactically different. In addition, the control statements may be generated to run on various programs, which might require the control statements to be syntactically different to conform to that program's requirements.

With the control statements generated to fulfill the desired maintenance, executing the control statements facilitates maintenance completion. In one embodiment, executing control statements includes selecting the utility to run each control statement depending on the syntax of the control statement. Similarly, executing control statements may include selecting a utility to run each control statement depending on the data set being maintained, or the maintenance operation to be performed.

In a further embodiment, the method includes retaining data set anonymity by first determining the contents as well as the associations of the volume from the VTOC. Additionally, by examining the VTOC first, the method eliminates any potential mismatches of the volume contents with the catalogs introduced by maintenance performed on the volume. The volume to be maintained may be identified by the set of initial control statements. Likewise, the set of initial control statements may identify data sets to bypass for maintenance.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
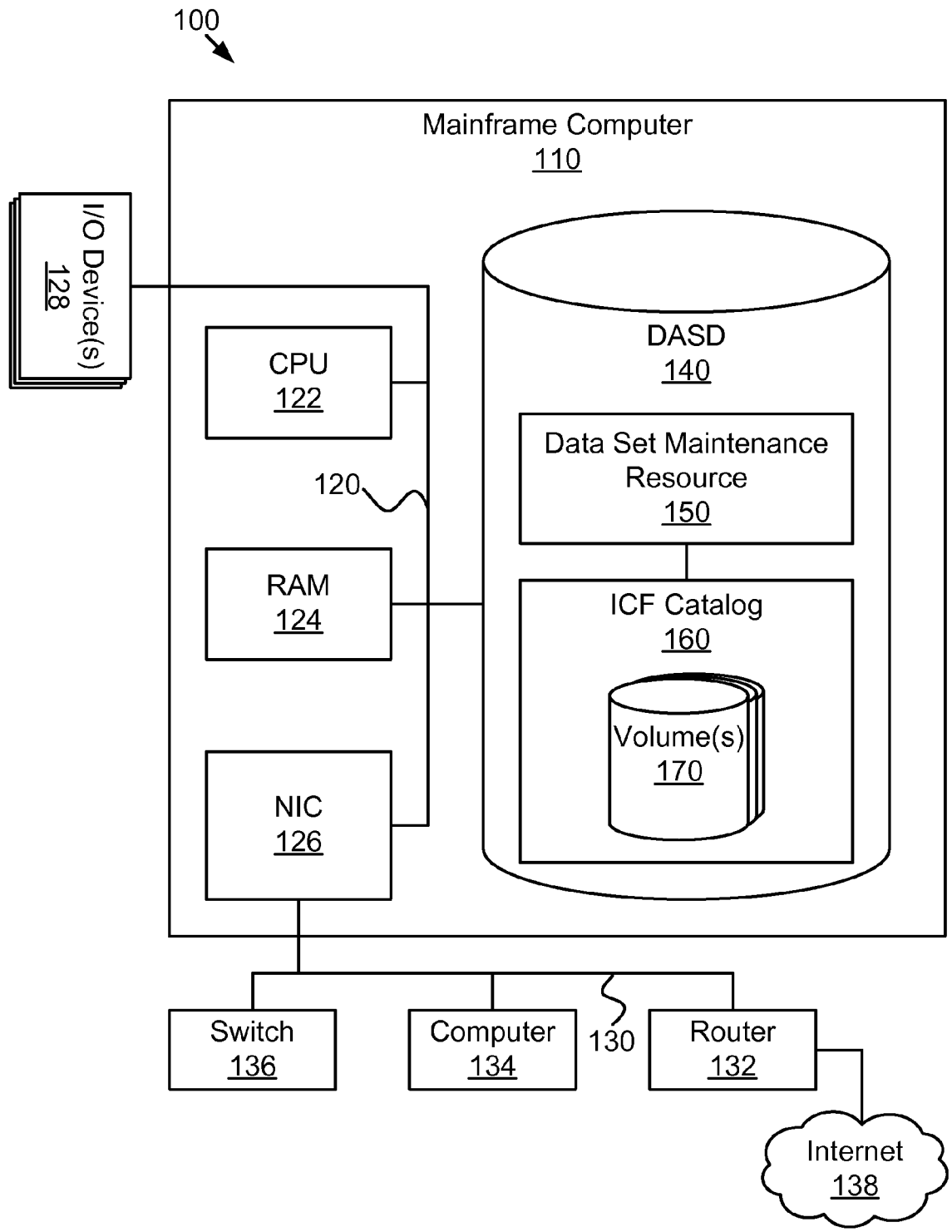
FIG. 1 is a schematic block diagram illustrating one embodiment of a mainframe computer system for automating VTOC driven data set maintenance in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other computer readable storage medium.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a mainframe computer system for automating volume table of contents (VTOC) driven data set maintenance in accordance with the present invention. The mainframe computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set maintenance resource 150, an integrated catalog facility (ICF) catalog 160, and one or more volumes 170. The depicted mainframe computer system 100 is one embodiment for automating VTOC driven data path redundancy.

The depicted mainframe computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the mainframe computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the mainframe computer 110 to communicate with devices on the network 130. Such devices may comprise the computer 134, the switch 136, or the router 132. The computer 134 may be another mainframe computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set maintenance resource 150. In the depicted embodiment, the data set maintenance resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
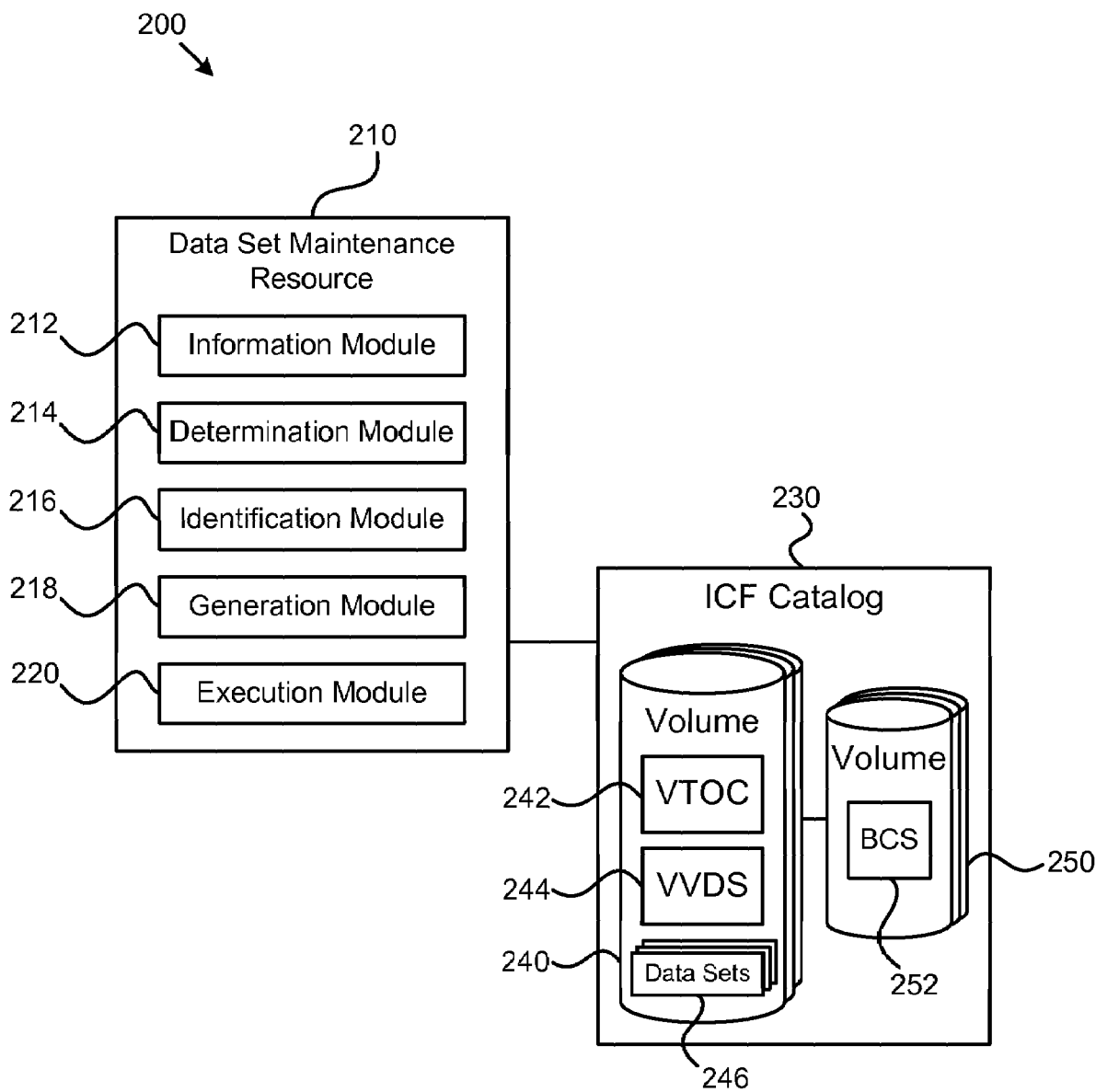
FIG. 2 is a schematic block diagram illustrating one embodiment of a data set maintenance resource and integrated catalog facility (ICF) in accordance with the present invention.

FIG. 2 depicts one embodiment of a DASD environment comprising a data set maintenance resource and an integrated catalog facility (ICF) catalog in accordance with the present invention. The DASD environment 200 includes a data set maintenance resource 210, an information module 212, a determination module 214, an identification module 216, a generation module 218, an execution module 220, an integrated catalog facility (ICF) catalog 230, a volume 240, a volume table of contents (VTOC) 242, a VSAM volume data set (VVDS) 244, data sets 246, a volume 250, and a basic catalog structure (BCS) 252. The depicted DASD environment 200 is one embodiment for automating VTOC driven data set maintenance.

In the depicted embodiment, the data set maintenance resource 210 includes the information module 212, the determination module 214, the identification module 216, the generation module 218, and the execution module 220. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed.

Other information retrieved by the information module may include a data set name, catalog status, the type entry in the catalog such as the type of data set or the VSAM index of a VSAM data set, or associated data set names if applicable. The information retrieved may further include identification of data sets to bypass during the maintenance.

In one embodiment, data set anonymity is retained by first determining the contents as well as the associations of the volume from the VTOC 242. Data set anonymity means keeping the information identifying a data set anonymous by referencing other sources to acquire information about the data set as opposed to the data set itself. Data set anonymity is advantageous for the user because numerous data set names needs not be memorized or otherwise tracked. Any necessary identification of the data set is discovered via the VTOC 242, and further discovered via the VVDS 244, and may be even further discovered via the BCS 252. By examining the VTOC 242 first, the method may also eliminate any potential mismatches of the volume contents with the catalogs introduced by maintenance performed on the volume because the VTOC 242 includes information regarding VSAM data set associations.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In the depicted embodiment, the determination module 214 determines one or more maintenance operations to perform. The determination module 214 may examine control statements received from a director to determine the one or more maintenance operations to perform. The determination module 214 may use the information obtained from the information module 212 for further determination in the data set maintenance resource 210. The determination module 214 may use the information obtained from the initial control statements received from a director for further determination in the data set maintenance resource 210.

The identification module 216 may identify related data sets by using an association identifier. The association identifier may be included with the information retrieved from the information module 212. The association identifier may be a name of a cluster of data sets. In one embodiment, the association identifier is required to perform maintenance on the data sets. In this embodiment, if the cluster name is not provided by the information module 212, then the information module 212 substitutes a supplemental identifier as the association identifier so the maintenance can proceed. The supplemental identifier may be a null value. In one embodiment, the supplemental identifier is a predetermined value capable of being incremented to prevent mismatching associations.

In one embodiment, the generation module 218 generates one or more control statements for performing one or more maintenance operations on the data sets 246. The control statements may be run by a plurality of utilities which require syntactically different control statements; in this situation, the control statements must be generated to be executed by a selected utility. The type of data set being maintained may determine the utility to generate control statements for. In one embodiment, the determination module 214 determines what maintenance operations to perform on the data sets 246. The generation module 218 may generate control statements based on the determination of the maintenance to perform by the determination module 214.

The execution module 220 executes the one or more generated control statements to perform maintenance on the data sets 246. In one embodiment, the execution module 220 selects a utility to execute the generated control statement with. Selecting a utility may be based on the type of data set to be processed. In another embodiment, selecting a utility is based on the syntax of the control statement.

One utility that may be used by the execution module 220 is IDCAMS. IDCAMS is a utility used to create, delete, rename, catalog, or uncatalog data sets. IDCAMS may also be used to manage catalogs. Another utility that may be used by the execution module 220 is IEHPROGM. IEHPROGM is a utility that provides facilities for deleting or renaming data sets and for cataloging or uncataloging non-VSAM data sets. The execution module 220 may not be limited to using just IDCAMS or IEHPROGM. In one embodiment, the execution module 220 uses any utility capable of performing the desired maintenance.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set maintenance resource 210 reside on the DASD 140. The data set maintenance resource 210 may act on the ICF catalog 230 and its components to automate VTOC driven data set maintenance.

In a preferred embodiment, the data set maintenance resource 210 utilizes the VTOC 242 to obtain information about volume 240 and data sets 246. The VTOC 242 may store certain information regarding data sets such as data set attributes and a description, which may include size, location, and permissions. The VVDS 244 may also be used by the data set maintenance resource 210 to obtain information regarding data sets 246.

Data sets 246 are collections of logically related data records. Data sets 246 may include both VSAM and non-VSAM data sets. VSAM is an IBM (International Business Machines) disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM operating system, which has evolved into the present z/OS 64-bit IBM operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may also be used by the data set maintenance resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table Of Contents; the relationship between the BCS 252, VVDS 244, and VTOC 242 is not exclusive.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
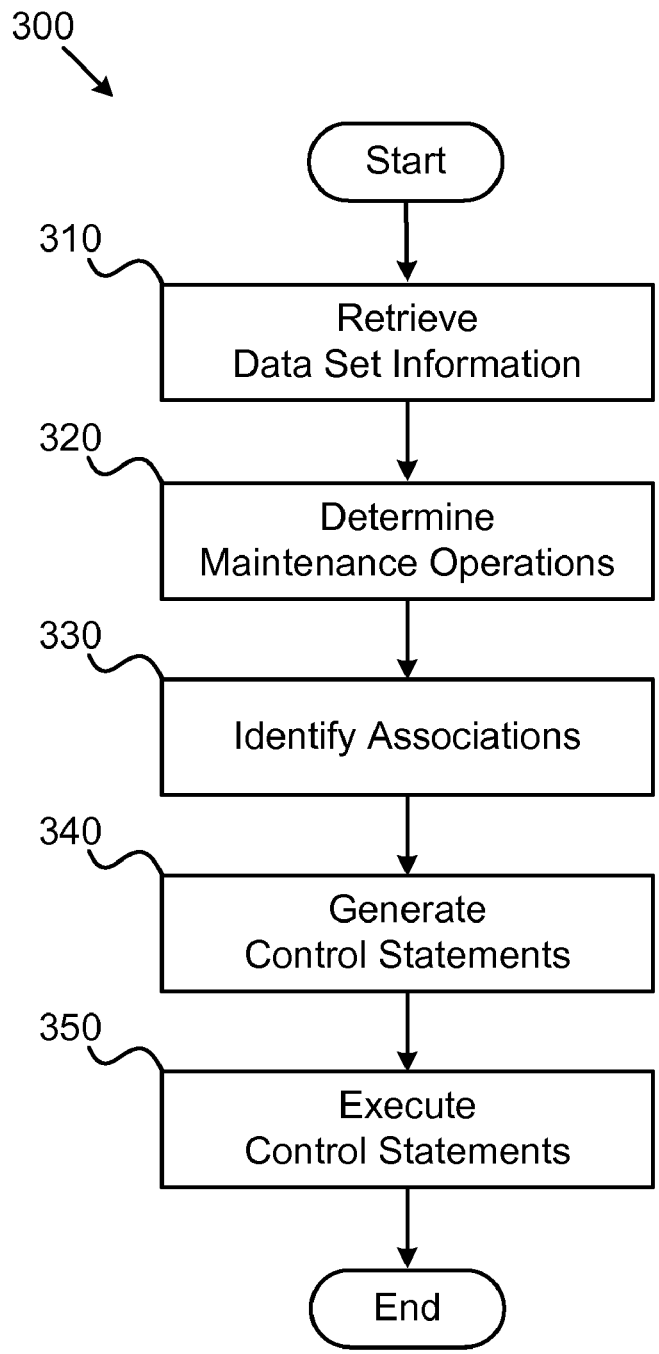
FIG. 3 is a schematic flow chart diagram illustrating one embodiment of a method for automating VTOC driven data set maintenance in accordance with the present invention.

FIG. 3 depicts one method for automating VTOC driven data set maintenance in accordance with the present invention. The method 300 includes retrieving 310 data set information, determining 320 one or more maintenance operations, identifying 330 associations, generating 340 one or more control statements, and executing 350 the control statements. The method 300 facilitates automating VTOC driven data set maintenance in accordance with the present invention.

Retrieving 310 data set information may include retrieving identifying information from an initial set of control statements indicating a volume from which to retrieve the data set information. The data set information may be obtained using a program such as IEHMAP to generate a report about a volume's VTOC. In one embodiment, the information is retrieved from the VTOC before any maintenance occurs.

Additional data set information may also be retrieved from a VVDS and a BCS. The information may include a data set name, a catalog status, a type entry in the catalog such as a type of data set or a VSAM index of a VSAM data set, or associated data set names if applicable. Retrieving 310 data set information may further include identifying data sets to bypass during the maintenance.

Determining 320 one or more maintenance operations to perform may include extracting the maintenance operations from a set of initial control statements. The maintenance operations may include cataloging uncataloged data sets, uncataloging cataloged data sets, and deleting either uncataloged or cataloged data sets.

Identifying 330 associations may include examining the information retrieved to obtain an association identifier that is common to the association or cluster, also called a cluster name. Identifying 330 associations may prevent alienating data sets during maintenance. In one embodiment, an association identifier may not be provided in the retrieving operation 310, but might be required as a parameter of a control statement. In this embodiment, the retrieving operation 310 may substitute a supplemental identifier as the association identifier, so that the identifying operation 330 may obtain the association identifier.

Generating 340 one or more control statements may include generating control statements designed to perform a required maintenance. In one embodiment, a plurality of programs are capable of running control statements, however, the programs might require syntactically different control statements. In this embodiment, the control statements must be generated for execution by a specific program. The type of data sets being maintained may determine the program selected to execute the control statement. In one embodiment, determining 320 one or more maintenance operations is directly related to generating 340 one or more control statements because the type of maintenance determines what program will execute the control statements.

Executing 350 the control statements may include selecting the appropriate program to execute the generated control statements. In one embodiment, the program is selected based on the data sets being maintained. In another embodiment, the program is selected based on the type of maintenance to perform. In yet another embodiment, the program is selected based on the generated control statements. The generated 340 control statements may be generated for execution by different programs; therefore, the executing operation 350 may include selecting multiple programs to execute different control statements.

Figure 4:
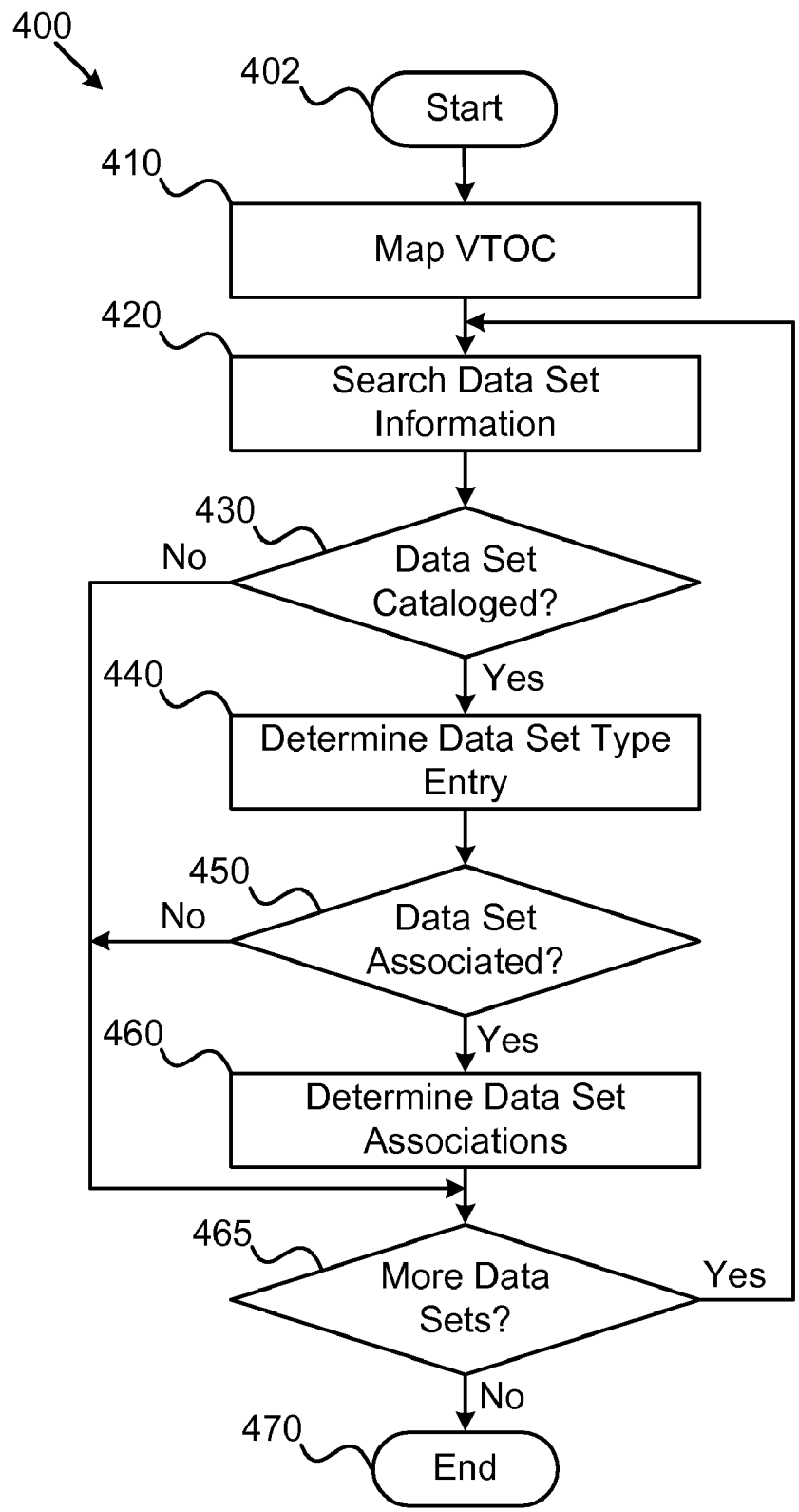
FIG. 4 is a schematic flow chart diagram illustrating one embodiment of a method for retrieving data set information in accordance with the present invention.

FIG. 4 depicts one method for retrieving data set information in accordance with the present invention. The method 400 includes mapping 410 the VTOC, searching 420 data set information, deciding 430 if the data set is cataloged, determining 440 the data set type entry, deciding 450 if the data set has associations, and determining 460 data set associations. The method 400 facilitates retrieving data set information as part of automating VTOC driven data set maintenance.

Mapping 410 the VTOC may be completed before any maintenance operations are performed. Mapping 410 the VTOC may generate a report listing the data sets on the volume. In one embodiment, mapping 410 the VTOC is accomplished by running the IEHMAP program. The report generated may contain extractable data regarding the data sets on the volume. The data may comprise a data set name, a volume identifier, and a data set organization. The data set organization may include whether the data set is VSAM and whether it is sequential or partitioned.

Searching 420 data set information may include receiving data from the report generated by mapping 410 the VTOC. Each data set in the report may be searched. Searching 420 the data set information may require receiving the data set name. Searching 420 the data set information may require receiving an indicator that associations are requested, the cluster name may be supplied as the associated data set names. In one embodiment, searching 420 the data set information indicates whether the data set is cataloged. If the data set is cataloged, additional information may include an indication of the type of data set and associated data set names for VSAM data sets.

In one embodiment, searching 420 the data set information is accomplished through a catalog search interface (CSI) module such as the IGGCSI00 program. Searching 420 the data set information provides information necessary for deciding 430 if the data set is cataloged. If the data set is not cataloged, then further information may not be required because the data set name and catalog status are known. If the data set is not cataloged, then deciding 465 if there are more data sets to search may either end the method at step 470 or continue the method by searching 420 the next data set's information.

If the data set is cataloged, then further information regarding the data set may be obtained. For example, receiving further information may require determining 440 the data set type entry in the catalog. In one embodiment, the data set type entry in the catalog includes the type of data set. If the data set is a VSAM type data set, then the data set type entry in the catalog may also include a VSAM index data set and a VSAM data set. Deciding 450 if the data set is associated may include identifying what type of data set the data set is.

If the data set is non-VSAM, then there are no associations and deciding 465 if there are more data sets to search may either end the method at step 470 or continue the method by searching 420 the next data set's information. If the data set is VSAM, then the information included in determining 440 the data set type entry includes the VSAM index and associated data set names. Determining 460 data set associations may include reading the information obtained from determining 440 the data set type entry to obtain the data set associations.

Figure 5:
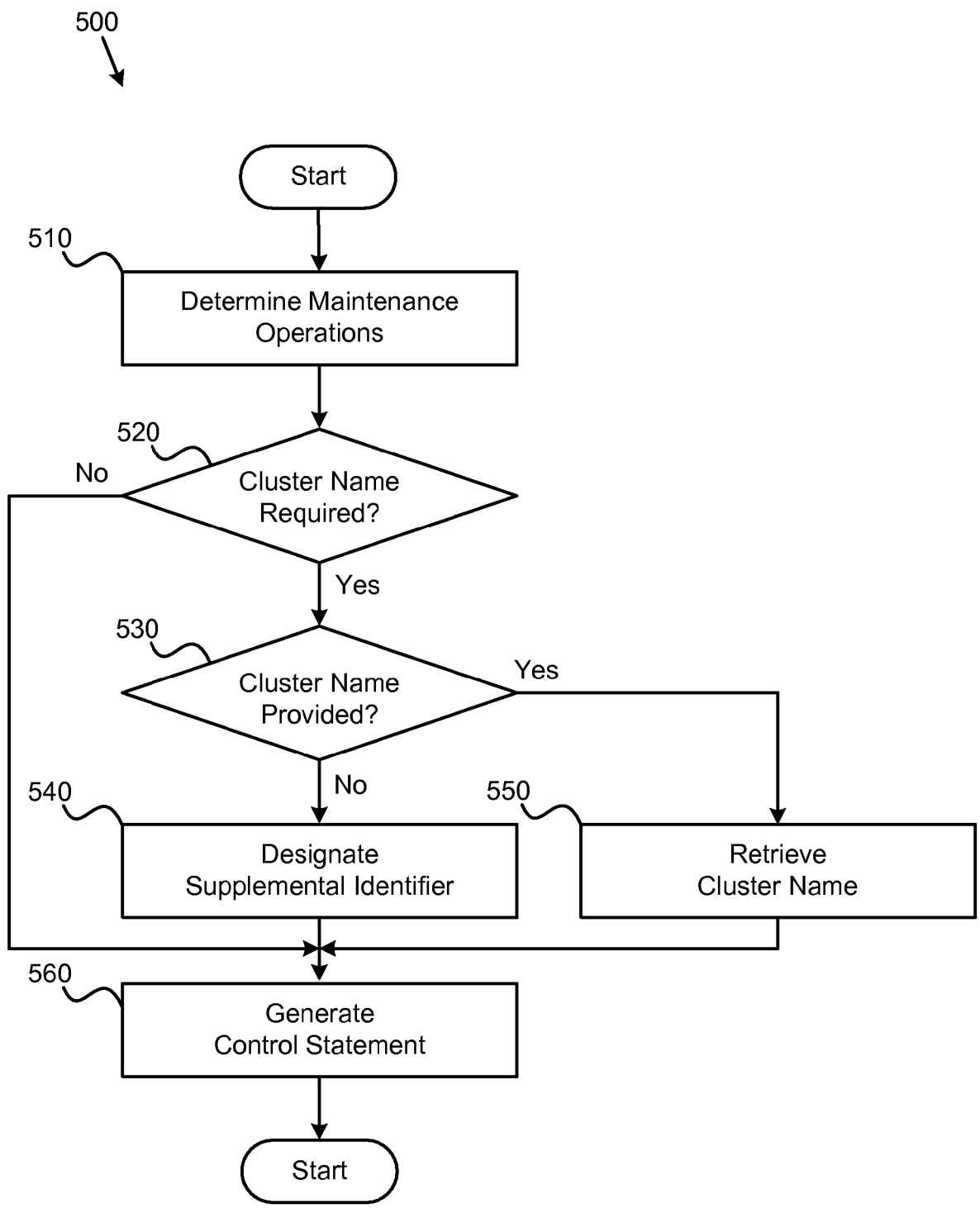
FIG. 5 is a schematic flow chart diagram illustrating one embodiment of a method for generating control statements in accordance with the present invention.

FIG. 5 depicts one method for generating control statements in accordance with the present invention. The method 500 includes determining 510 one or more maintenance operations, deciding 520 if a cluster name is required, deciding 530 if the cluster name is provided, designating 540 a supplemental identifier, retrieving 550 the cluster name, and generating 560 one or more control statements. The method 500 facilitates generating control statements in accordance with the present invention.

Determining 510 one or more maintenance operations may include identifying what syntax a control statement requires. In one embodiment, determining 510 one or more maintenance operations identifies whether a cluster name will be required for the control statement to execute properly. Deciding 520 if the cluster name is required may depend on the operation the control statement will perform as part of the maintenance. If deciding 520 that the cluster name is not required then the method proceeds by generating 560 one or more control statements.

If deciding 520 determines that the cluster name is required, then initial control statements provided by a director may be examined. The initial control statements provided by a director may include a function to identify a low-level qualifier for VSAM data sets; the function may be VSAM-LLQ. The VSAMLLQ function may be used to extrapolate a VSAM cluster name by replacing the low-level qualifier name of the data set with the VSAMLLQ value. Deciding 530 whether the cluster name is provided may include determining if the VSAMLLQ function is present and assigned a value.

If the VSAMLLQ function is present and provided with a value, then retrieving 550 the cluster name may include replacing the low-level qualifier name of the data set with the VSAMLLQ function value. If the VSAMLLQ function is not provided with a value or not present, then the low-level qualifier name of the data set may be replaced by a supplemental identifier acting as the cluster name. Once the cluster name is acquired either by retrieving 550 the cluster name or by designating 540 a supplemental identifier, generating 560 one or more control statements may include incorporating the cluster name into the control statement that requires it. One or more control statements may be generated regarding a data set and not all of the control statements may require the cluster name.

Figure 6:
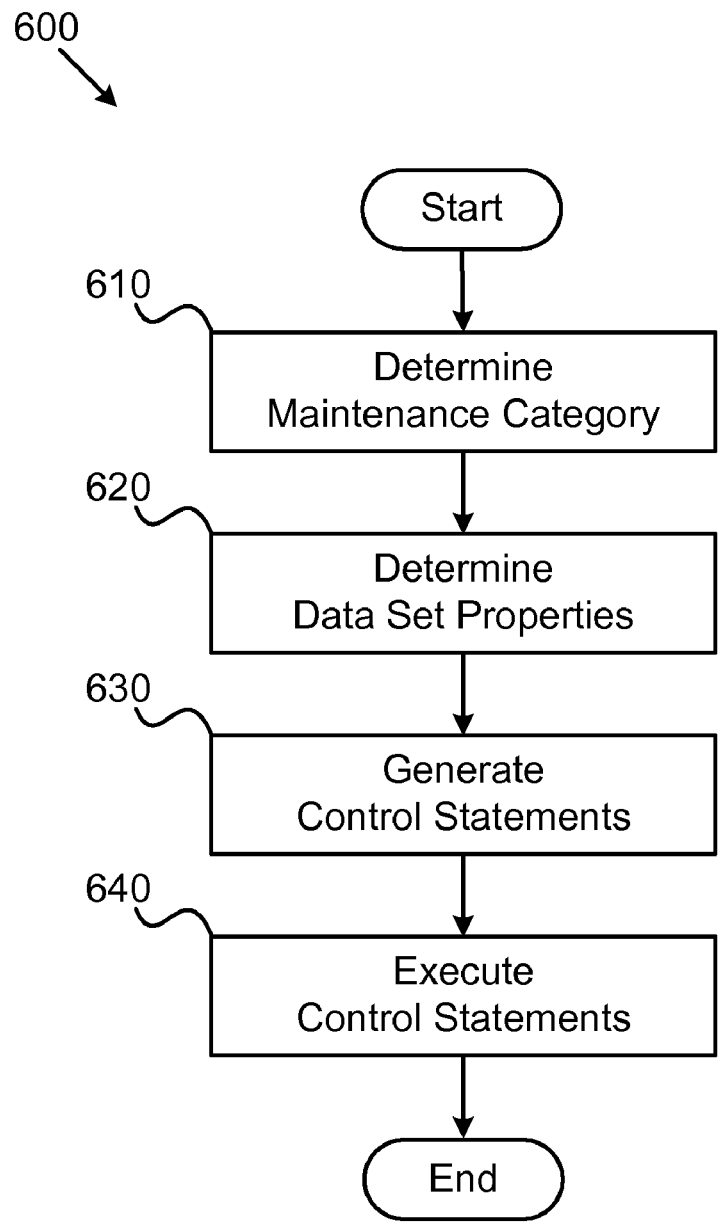
FIG. 6 is a schematic flow chart diagram illustrating one embodiment of a method for generating and executing control statements in accordance with the present invention.

FIG. 6 depicts one method for generating and executing control statements in accordance with the present invention. The method 600 includes determining 610 the maintenance category, determining 620 the data set properties, generating 630 one or more control statements, and invoking 640 the program to execute the control statements. The method 600 facilitates generating and executing control statements in accordance with the present invention.

Determining 610 the maintenance category includes identifying what type of maintenance to perform on the data sets. In one embodiment, the maintenance is deleting cataloged data sets. In another embodiment, the maintenance is deleting uncataloged data sets. The maintenance might include uncataloging cataloged data sets. Similarly, the maintenance might include cataloging uncataloged data sets. In one embodiment, the maintenance includes one or more of the preceding actions. Determining 610 the maintenance category might include examining initial control statements to identify what type of maintenance to perform.

Once the maintenance category has been determined, determining 620 the data set properties is required. Determining 620 the data set properties includes identifying information regarding the data set. This information might help to facilitate generating 630 one or more control statements. The data set properties might include a data set name, a data set catalog status, a data set type, a data set type entry in the catalog if applicable, and a data set's associations if applicable.

Determining 620 the data set properties might include executing a program to retrieve a list of data sets from the VTOC. Such a program might be IEHMAP or the like. Determining 620 the data set properties might include executing a search program to search each data set listed in the VTOC and to retrieve the identified information regarding each data set. Such a program might be the IGGCSI00 module of IBM's catalog search interface (CSI) or the like, which programs retrieve catalog data.

Generating 630 one or more control statements may utilize the maintenance category determined in conjunction with the data set properties determined to generate applicable control statements. Generating 630 one or more control statements may include generating syntactically different control statements depending on the type of data set being maintained. In one embodiment, generating 630 one or more control statements includes generating syntactically different control statements depending on the program that will be used to execute the control statement. Generating 630 one or more control statements may include generating multiple control statements for one data set depending on the type of maintenance category determined 630.

Invoking 640 a program to execute the control statements may include examining the syntax of the control statement to identify what program to invoke. In one embodiment, invoking 640 a program to execute control statements includes invoking multiple programs to execute a set of control statements. Such programs may include IDCAMS, IEHPROGM, or the like. In another embodiment, invoking 640 a program to execute control statements includes invoking only one program to execute a set of control statements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to automate volume table of contents (VTOC) driven data set maintenance, the apparatus comprising:
    an information module configured to retrieve information regarding data sets residing on a volume while retaining data set anonymity by first determining the contents and associations of the volume from a volume table of contents (VTOC);
    a determination module configured to determine at least one maintenance operation to perform on the data sets for which the information module retrieved information, wherein the maintenance operation includes at least one of cataloging data sets, uncataloging data sets, and deleting data sets;
    an identification module configured to identify related data sets using an association identifier obtained from the information retrieved by the information module, wherein identified related data sets searching each data set listed in the VTOC and retrieving the identified information regarding each data set;
    a generation module configured to generate at least one control statement depending on the type of maintenance operation determined for performing the at least one maintenance operation on the data sets for which the information module retrieved information wherein at least one control statement identifies resources required to execute the control statement; and
    an execution module configured to execute the at least one control statement to perform the at least one maintenance operation on the data sets for which the information module retrieved information and the related data sets,
    wherein the information module, determination module, identification module, generation module, and execution module comprise one or more of logic hardware comprising a processor and memory and executable code, the executable code stored on a computer readable storage medium.

2. The apparatus of claim 1, wherein the determination module is further configured to determine the at least one maintenance operation to perform based on a set of initial control statements received from a director.

3. The apparatus of claim 2, wherein the determination module is further configured to determine a data set to bypass indicated by the set of initial control statements.

4. The apparatus of claim 1, wherein the information module is further configured to designate a supplemental identifier as the association identifier when the association identifier is not provided by the information module.

5. The apparatus of claim 1, wherein the execution module is further configured to select a utility to execute the at least one generated control statement based on a type of data set to process.

6. The apparatus of claim 1, wherein the at least one generated control statement is configured to execute by a selected utility.

7. The apparatus of claim 1, wherein the retrieved information comprises a data set catalog status.

8. A computer program product stored on a computer readable storage medium having computer usable program code programmed, said computer usable program when executed by a computer causes a processor to perform automated volume table of contents (VTOC) driven data set maintenance, the computer program product having operations comprising:
    retrieving information regarding data sets residing on a volume by way of a volume table of contents (VTOC);
    retaining data set anonymity by first determining the contents and associations of the volume from the VTOC;
    determining at least one maintenance operation to perform on the data sets for which the information is retrieved, wherein the maintenance operation includes at least one of cataloging data sets, uncataloging data sets, and deleting data sets;
    identifying related data sets using an association identifier obtained from the information regarding the data sets, wherein identified related data sets searching each data set listed in the VTOC and retrieving the identified information regarding each data set;
    generating at least one JCL control statement depending on the type of maintenance operation determined for performing the at least one maintenance operation on the data sets for which the information is retrieved, wherein at least one JCL control statement identifies resources required to execute the JCL control statement; and
    executing the at least one JCL control statement to perform the at least one maintenance operation on the data sets for which the information is retrieved and on the related data sets.

9. The computer program product of claim 8, wherein the operations further comprise determining the at least one maintenance operation to perform on the data sets based on a set of initial JCL control statements received from a director.

10. The computer program product of claim 9, further comprising determining a data set to bypass based on the set of initial JCL control statements.

11. The computer program product of claim 8, wherein the JCL operations further comprise designating a supplemental identifier as the association identifier.

12. The computer program product of claim 8, further comprising selecting a utility to execute the at least one generated JCL control statement based on a data set type.

13. The computer program product of claim 12, wherein the at least one generated JCL control statement is generated to execute by the selected utility.

14. The computer program product of claim 8, wherein the retrieved information comprises a catalog status.

15. A method to enhance automating volume table of contents (VTOC) driven data set maintenance, the method comprising:
    receiving a set of initial control statements configured to determine a volume to process and identify a maintenance category, for the volume;

providing receiving an integrated catalog facility (ICF) catalog; and executing a data set maintenance tool configured to:

retrieve information regarding data sets residing on a volume using a volume table of contents (VTOC);

retain data set anonymity by first determining the contents and associations of the volume from the VTOC;

determine at least one maintenance operation to perform on the data sets for which the information is retrieved, wherein at least one maintenance operation includes cataloging data sets, uncataloging data sets, and deleting data sets;

identify related data sets a using an association identifier obtained from the retrieved information regarding the data sets, wherein identified related data sets searching each data set listed in the VTOC and retrieving the identified information regarding each data set;

generate at least one JCL control statement depending on the type of maintenance operation determined for performing the at least one maintenance operation on the data sets for which the information is retrieved, wherein at least one JCL control statement identifies resources required to execute the JCL control statement; and execute the at least one JCL control statement to perform the at least one maintenance operation on the data sets for which the information is retrieved and on the related data sets.

16. The method of claim 15, wherein the data set maintenance tool is further configured to determine the at least one maintenance operation to perform on the data sets based on a set of initial JCL control statements received from a director and configured to designate a supplemental identifier as the association identifier.

17. A system configured to facilitate automating volume table of contents (VTOC) driven data set maintenance, the system comprising:

a computer comprising at least one direct access storage device (DASD), random access memory (RAM), and at least one central processing unit (CPU) configured to access the random access memory and the direct access storage device;

at least one integrated catalog facility (ICF) catalog comprising data sets and meta-data for data sets;

a data set maintenance resource stored on a DASD and configured to run on a CPU in response to a reportable operational event in the ICF catalog, the data set maintenance resource comprising:

an information module configured to retrieve information regarding data sets residing on a volume while retaining data set anonymity by first determining the contents and associations of the volume from a volume table of contents (VTOC);

a determination module configured to determine at least one maintenance operation to perform on the data sets for which the information module retrieved information, wherein the maintenance operation includes at least one of cataloging data sets, uncataloging data sets, and deleting data sets;

an identification module configured to identify related data sets using an association identifier obtained from the information retrieved by the information module, wherein identified related data sets searching each data set listed in the VTOC and retrieving the identified information regarding each data set;

a generation module configured to generate at least one JCL control statement depending on the type of maintenance operation determined for performing the at least one maintenance operation on the data sets for which the information module retrieved information, wherein at least one JCL control statement identifies resources required to execute the JCL control statement; and an execution module configured to execute the at least one JCL control statement to perform the at least one maintenance operation on the data sets for which the information module retrieved information and on the related data sets.

18. The system of claim 17, wherein the data set maintenance resource is further configured to determine the at least one maintenance operation to perform on the data sets based on a set of initial control statements received from a director.

* * * * *